(12) United States Patent
Kornienko et al.

(10) Patent No.: US 10,937,230 B2
(45) Date of Patent: Mar. 2, 2021

(54) IMAGE PROCESSING

(71) Applicant: Apical Limited, Cambridge (GB)

(72) Inventors: Alexey Kornienko, Cambridge (GB); David Hanwell, Cambridge (GB)

(73) Assignee: Apical Limited, Cambridge (GB)

( * ) Notice: Subject to any disclaimer, the term of this patent is extended or adjusted under 35 U.S.C. 154(b) by 0 days.

(21) Appl. No.: 16/370,345

(22) Filed: Mar. 29, 2019

(65) Prior Publication Data
US 2020/0312017 A1 Oct. 1, 2020

(51) Int. Cl.
*G06T 15/80* (2011.01)
*G06T 15/00* (2011.01)
*G06T 17/20* (2006.01)

(52) U.S. Cl.
CPC ............ *G06T 15/80* (2013.01); *G06T 15/005* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 2009/0043524 A1* | 2/2009 | Hung | ...................... | G06T 5/006 702/86 |
| 2016/0171697 A1* | 6/2016 | Paliy | .................... | H04N 17/002 348/187 |
| 2019/0320875 A1* | 10/2019 | Jones | .................... | A61B 5/1459 |

* cited by examiner

*Primary Examiner* — YuJang Tswei
(74) *Attorney, Agent, or Firm* — EIP US LLP

(57) ABSTRACT

A method of calibrating image data, the method comprising the steps of obtaining the image data and applying a shading correction mesh to the image data, wherein the shading correction mesh comprises a plurality of nodes, and is used to generate shading correction values for each pixel location in the image data. The blocks of the generated shading correction values are then grouped each group of blocks comprising a plurality of blocks, and each block comprising a plurality of pixel locations. An analysis of each of the groups of blocks of generated shading correction values is performed, and an updated shading correction mesh based on the analysis of the groups of one or more blocks is generated.

16 Claims, 3 Drawing Sheets

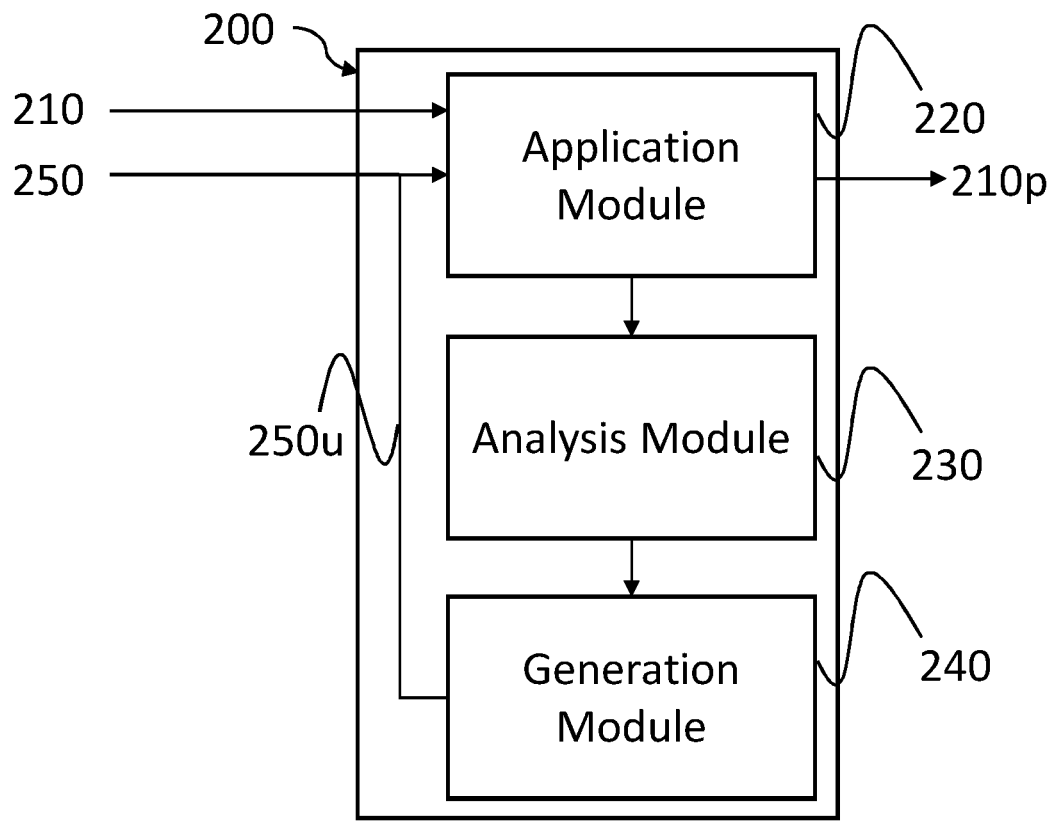
FIG. 2
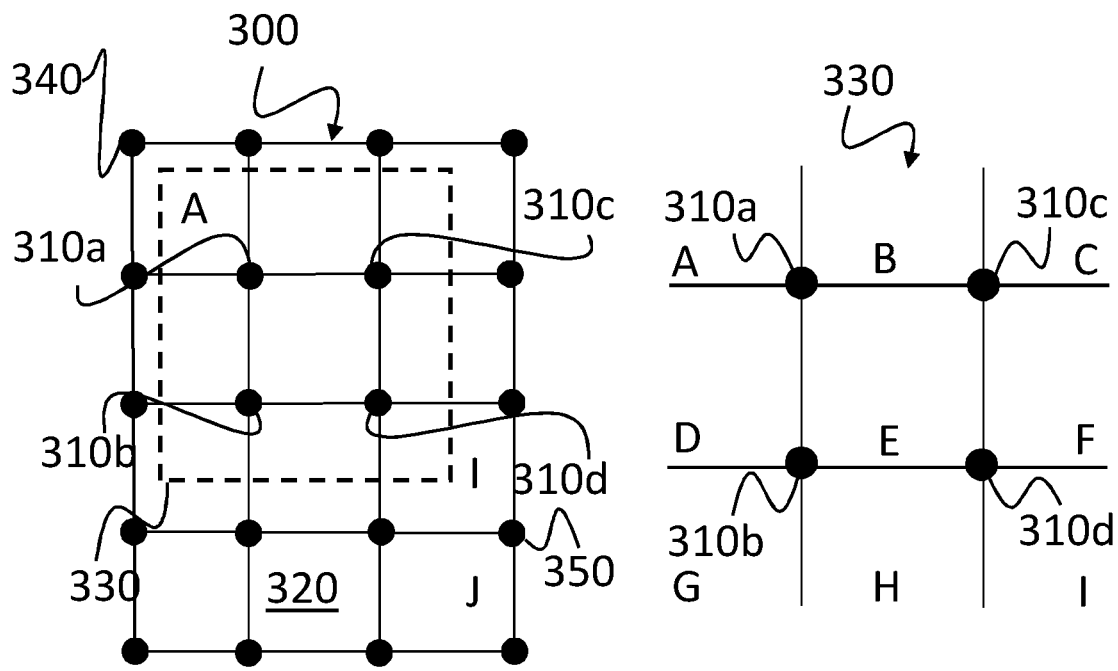
FIG. 3A
FIG. 3B

IMAGE PROCESSING

BACKGROUND OF THE INVENTION

Technical Field

The present invention relates to methods and apparatus for processing image data.

Background

Lens shading is a common distortion in imaging systems wherein the intensity of the image decreases gradually away from the image sensor. This distortion is due to the fact that the angle of incidence of light on the imaging sensor varies depending on the distance from the center of the image. Other factors, such as the colour of the light, the choice of the lens, manufacturing variation in the sensor and misalignment or variation of the lens position or angle during assembly may also affect the shape of the distortion.

SUMMARY

According to a first aspect of the present invention, there is provided a method of calibrating image data, the method comprising the steps of obtaining the image data; applying a shading correction mesh to the image data, wherein the shading correction mesh comprises a plurality of nodes, and is used to generate shading correction values for each pixel location in the image data; grouping blocks of the generated shading correction values into groups of blocks, each group of blocks comprising a plurality of blocks, and each block comprising a plurality of pixel locations; performing an analysis of each of the groups of blocks of generated shading correction values; and generating an updated shading correction mesh based on the analysis of the groups of one or more blocks.

According to a second aspect of the present invention, there is provided a processor for calibrating image data comprising an application module, for applying a shading correction mesh to the image data, wherein the shading correction mesh comprises a plurality of nodes, and is used to generate shading correction values for each pixel location in the image data; an analysis module, for performing an analysis of each of a plurality of blocks of the image data after application of the shading correction mesh; and a generation module, for updating the shading correction mesh based on the analysis, wherein the updated shading correction mesh is based on groups of the one or more blocks of the image data.

According to a third aspect of the present invention, there is provided a non-transitory computer readable storage medium comprising a set of computer-readable instructions stored thereon which, when executed by at least one processor, cause the at least one processor to calibrate image data, the instructions comprising obtaining the image data; applying a shading correction mesh to the image data, wherein the shading correction mesh comprises a plurality of nodes, and is used to generate shading correction values for each pixel location in the image data; grouping blocks of the generated shading correction values into groups of blocks, each group of blocks comprising a plurality of blocks, and each block comprising a plurality of pixel locations; performing an analysis of each for the groups of blocks of generated shading correction values; and generating an updated shading correction mesh based on the analysis of the groups of one or more blocks.

BRIEF DESCRIPTION OF DRAWINGS

Further features and advantages of the invention will become apparent from the following description of preferred embodiments of the invention, given by way of example only, which is made with reference to the accompanying drawings in which like reference numerals are used to denote like features.

FIG. 2 shows schematically a processor according to examples;

FIG. 3A shows schematically a secondary mesh for use in generating an updated shading correction mesh to be applied to image data according to an example;

FIG. 3B shows schematically a portion of the secondary mesh for use in generating an updated shading correction mesh to be applied to image data according to the example shown in FIG. 3A.

DETAILED DESCRIPTION

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain feature omitted and/or necessarily simplified for the ease of explanation and understanding of the concepts underlying the examples.

Different colors of light are affected differently, and each channel of an image sensor, for example, a red, blue and green channel may have a different shading shape or distortion. As such, this results in a spatial variation in color response across an image, for example, an image may comprise an area in the center of the image having a pinkish hue, whereas areas towards the edge of the image may have a greenish hue. This is known as chroma or color shading. Other distortions may also be present in an image, for example, an image may be brighter in the center of the image, and when considered in isolation from the varying hue, this is known as luminance shading. This lens shading can be considered to comprise two aspects, luminance shading and chroma shading.

The human eye can perceive a dynamic range in excess of 55 dB, whereas image sensors may have a dynamic range of between 35 dB and 45 dB. The quality of the image of high dynamic range scenes, such as outdoor scenes with motion, or nighttime scenes with bright lights may, therefore, be reduced in images captured by image sensors when compared with the perception of such scenes by a human in real time. The human eye is also more sensitive to variations in color than to variations in luminance. Therefore, it is necessary to ensure that chroma shading is more precisely corrected than luminance shading. As both aspects of shading vary between individual sensors and lenses, adequate correction of the phenomenon is often desirable to individually calibrate imaging systems to take account of these variances. This is time-consuming for mass-produced items, such as cellular telephones or digital cameras. Furthermore, because the chroma shading effect varies between different spectra of light, such as red, blue and green spectrums, it is desirable to perform calibration for each of these spectra, further increasing the amount of time and cost associated with the calibration actions.

Figure 1:
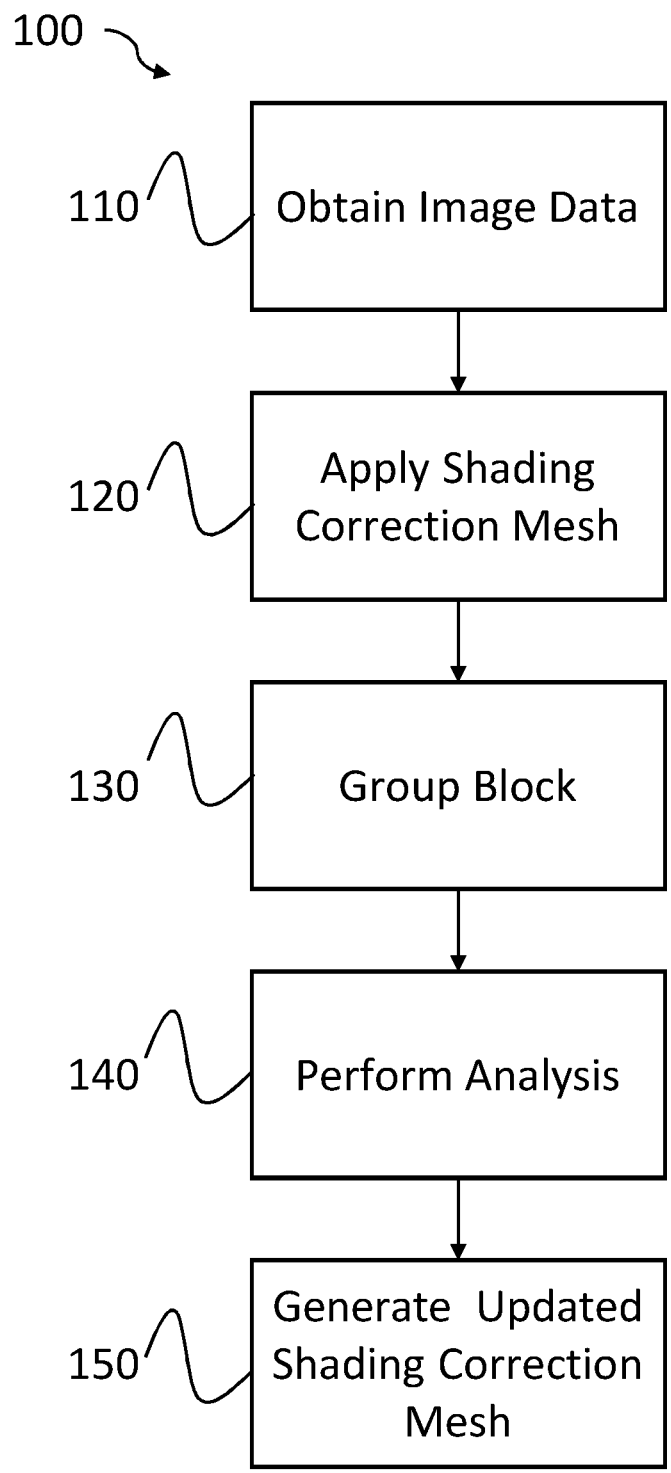
FIG. 1 is a flow diagram showing a method according to examples.

FIG. 1 is a flow diagram showing a method 100 for processing image data to adjust the lens shading distortions, according to examples. At item 110, image data is obtained. The image data may be obtained from storage of a device arranged to execute the method 100, may be obtained from an external source, such as a remote server, or from an external input device, such as an imaging apparatus or camera. The image data may be stored within storage of the device, and the storage may be a random-access memory (RAM) such as DDR-SDRAM (double data rate synchronous dynamic random-access memory) or other volatile memory. In other examples, the storage may be or include a non-volatile memory such as Read Only Memory (ROM) or a solid-state drive (SSD) such as Flash memory. The storage in examples may include further storage devices, for example magnetic, optical or tape media, compact disc (CD), digital versatile disc (DVD) or other data storage media. The storage may be removable or non-removable from the device.

The image data may be representative of at least a portion of an image and may be captured by an image sensor external to the device. An image sensor typically comprises an array of sensor pixels which may be any suitable photosensors for capturing images. For example, a typical sensor pixel includes a photosensitive element such as a photodiode that can convert incident light into electronic signals or data. The sensor pixel may, for example, be a charge-coupled device (CCD) or a complementary metal-oxide semiconductor (CMOS). An exposure typically sets the time period over which the light is captured by each sensor pixel of the image sensor and/or the gain applied by an amplifier to the electrical signal generated by each sensor pixel. The sensitivity of an image sensor to incident light is therefore generally determined by the exposure. The image sensor may be arranged to capture the image data using a single exposure. For example, all the sensor pixels of the image sensor may capture light during the same period or during a time period of the same length as each other. However, in other examples, an image sensor for use with examples described herein may be a multi-exposure image sensor, which is arranged to capture the image data using sensor pixels with at least two different exposures.

Therefore, the image data may represent at least one characteristic of the light captured by each sensor pixel, which may be proportional to the number of photons captured by each sensor pixel. The intensity may represent a luminance of the captured light, which is, for example, a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quality or characteristics that may be used to represent the visual appearance of the image represented by the image data. The image data may be in any suitable format, such as raw image format. The image data may also be streamed from the image sensor with or without being saved to a frame buffer, without saving the raw image data to a file. In such cases, image data obtained after processing of the raw image data may, however, be saved to a file.

In some examples, the image sensor includes a color filter array that includes a pattern of color filter elements. Color filter elements correspond to respective pixels sensors of an array of sensor pixels of the image sensor. The color filter array may be considered to form a mosaic or repeating pattern. A color filter element generally allows light of a particular color to pass through to the corresponding sensor pixel. In this way the color filter array allows different sensor pixels of the array of sensor pixels to receive different colors of incident light allowing a full-color image to be captured. As typical photosensors are not sensitive to the wavelength of incoming light, typical sensor pixels would be unable to provide color information from the detected light without a color filter array. However, by separating incoming light into different wavelength ranges, corresponding to different colors using the color filter array, the intensity of light in these different wavelength ranges, corresponding to different colors using the color filter array, the intensity of light in these different wavelength ranges can be ascertained, allowing this color information to be determined.

It is to be appreciated that a color may refer to any range of wavelengths of light. For example, a clear, transparent, or white color filter element may nevertheless be considered to be a color filter element in the sense that the color filter element allows these particular wavelengths (such as all or substantially all) wavelengths in the visible spectrum to be transmitted to the underlying sensor pixel. In other examples, some or all of the color filter elements may be non-white color filter elements.

A pattern of color filter elements may be formed of repeating groups of color filter elements. A group of color filter elements may, for example, include a red color filter element, a blue color filter element, and two green color filter elements. The color filter array may, therefore, correspond to a Bayer pattern, although other groups are possible in other examples. Each group may correspond with the necessary sensor pixels to obtain a full-color image of suitable quality.

Once the image data has been obtained, the method 100 progresses to item 120, where an initial shading correction mesh is applied to the image data. The initial shading correction mesh may be a predefined mesh based on an estimate of the adjustments to be applied to the image data. The estimate may be based on the characteristics of the device, for example, the type of lens used in an imaging system, or based on previous analysis of similar devices. The shading correction mesh may be generated by a processor, such as an image signal processor, and in some embodiments may be based on a flat field image under known lighting conditions. This may be captured and then inverted to generate per color channel correction meshes. In some embodiments, the appropriate white balance coefficients may then be computed and applied to the correction mesh to compute a single intensity mesh, by combining data from the different color channels. The shading correction mesh comprises a plurality of correction values arranged in a grid. The grid of values need not be the same resolution as the image data. For example, if the image data is representative of a 16-megapixel image, then the shading correction mesh may be a 33 by 33 mesh of values, however it will be appreciated that other sized shading correction meshes may be used, and the proportion of the size of the shading correction mesh to the size of the image data may also be different. In some examples, a portion of the image data may have a shading correction mesh applied to it, and further corrections may then be undertaken on that portion of the image data.

Once the initial shading correction mesh has been applied to the image data, the method progresses to item 130, where the image data is divided into a number of blocks which are then grouped, as will be described below. The image data number of blocks need not be the same as the number of pixels, in fact, it is preferable, although not necessary, that the number of blocks is smaller than the number of pixels. For example, where the image data is a 16-megapixel image, the number of blocks may form a grid 32 blocks by 32 blocks. Similarly, the number of blocks need not be the same as the number of values in the initial shading correction mesh.

Once the image data has been separated into a plurality of blocks, a number of statistics may be determined for each of the blocks. The statistics may include determining a mean and/or variance for each of the channels of the image data for each block. For example, the statistics may include a mean of the red/green ratio over locations within a block, a mean of blue/green ratio over locations within the block, a variance of red/green ratio over locations within the block, and a variance of blue/green ratios over locations within the block. In some examples, the variance statistics calculated may be normalized by dividing them by the squared mean. The number of statistics calculated for each block is dependent on the number of channels associated with the image data. For example, where the image data has three channels (e.g. a red, blue and green channel) there are two ratios used to generate the statistics, such as a red/green and blue/green ratio, where there are four channels, (e.g. a cyan, magenta, yellow, and black) three ratios may be used to generate the statistics. As such the number of ratios used to generate the statistics is determined based on the number of channels minus 1.

The statistics of each of the blocks of the image data are then used to determine groups of the blocks. To determine which blocks could potentially be grouped, the variance values are compared. If the difference between the variance values of two blocks is below a predetermined threshold, then they are said to be hue flat. To determine whether these hue flat blocks should be grouped together a number of other characteristics may also be compared. For example, if two hue flat blocks are spatially close or adjacent, and/or have the same or substantially similar mean values then they may form part of the same grouping.

Once the blocks have been grouped together based on the above statistics and other characteristics, the method proceeds to item 140, where an analysis of the blocks of the image data is undertaken.

The analysis involves calculating statistics for each of the groups of blocks. The statistics for the groups of blocks are the same as those calculated for each of the individual blocks. Therefore, where the image data comprises three separate channels (such as a red, green and blue channel) the statistics may be a variance of the red/green ratio, a variance of the blue/green ratio, a mean of the red/green ratio and a mean of the blue/green ratio. It will be appreciated that other statistics on the groups of blocks, and/or the individual blocks of the image data may be generated.

Once the statistics relating to the group of blocks have been generated a difference is calculated between each of the group statistics and the individual block statistics for the blocks making up the group. This produces a per-block error indicating how much each of the individual blocks differs from the overall group to which it belongs. In some examples, each of the errors may be smoothed using a small low-pass filter. Once the error has been calculated each block is then allocated the group of block's statistics. That is the block now has the statistics associated with the group and an error relating to that statistic and the original block value.

Once the errors have been determined, the method progresses to item 150, where an updated shading correction mesh is generated. The errors are then mapped to the initial, or where multiple rounds of correction have been undertaken, to the previous, shading correction mesh. However, the errors represent an error in a particular block, whereas the shading correction meshes are represented as nodes. As mentioned above, the shading correction mesh and the block-wise representation need not be the same size. In such examples, the secondary mesh is representative of a node at each corner/vertex of a block. The values of each node of the secondary mesh may be calculated by the mean of the block-wise values of the blocks which have corners at that node. It will be appreciated that other methods for calculating the values of the nodes may be used. In such an example, most nodes of the secondary mesh are contributed to by four block values, nodes at the edge are contributed by two blocks each, and the four corner nodes are contributed by a single block, as will be described below with reference to FIG. 3B.

A secondary mesh may be produced for each of the statistical values calculated previously at item 140, for example where the image data comprises a red, green and blue channel, a secondary mesh may be generated for each of the red/green mean and the blue/green mean for example. Each node of the secondary mech may have an initial node value calculated by combining the mean values for each of the surrounding blocks, and each node may also have an associated error value calculated by combining the error values for each block, wherein the error values are associated with the differences between the block values and the group of blocks values as described above. An updated node value may then be determined based on the error and node value. In some examples, the updated node value may be calculated by:

$$n' = n - \mu e \qquad \text{(equation 1)}$$

where n is the initial node value based on the combination of the mean values for each of the adjacent blocks, n' is the updated node value, e is the error value based on the error values of each of the adjacent blocks, and μ is a convergence factor.

In other embodiments, the updated node value may be calculated by:

$$n' = (1-\mu\beta) - \mu e + \mu\beta N \qquad \text{(equation 2)}$$

where n', n, and μ are as described above in relation to equation 1, and where N is the mean shading correction mesh as used to initialize the algorithm, and β is a tuning parameter representing the rate at which non-hue-flat block values move back towards a mean mesh value. This will cause blocks/groups of blocks which are not hue flat to have their values moved slowly back towards the mean mesh values. This can help the updated shading correction mesh to stay relevant as scene content moves or changes.

The convergence factor is a predetermined factor, such as 0.5 which dictates how quickly the node values are updated. The larger the convergence factor the quicker the node values converge to the desired output.

Once each of the nodes of the secondary mesh has been updated, an updated shading correction mesh for application to the image data may be generated. This may be achieved using a bilinear or bicubic interpolation between the nodes of the secondary correction mesh and the initial shading correction mesh, such that the values of the secondary correction mesh are mapped to the locations of the initial shading correction mesh. It will be appreciated that other methods of mapping the secondary mesh node values to the values of the shading correction mesh may be used. In some examples, the updated shading correction mesh node values may be normalized by dividing each by the lowest node value.

After the generation of the updated shading correction mesh, the shading correction mesh may be applied to the image data to produce an updated output. In some examples, the method 100 may then be performed again using the updated output and the updated shading correction mesh to further refine the output.

Whilst the discussion above has been in relation to chroma correction, since it is based on relationships between the different color channels of the image data, it may also be used to determine a luma shading correction mesh as the correction mesh for the green channel and multiplying the red and blue channel meshes by the luma shading correction mesh.

Similarly, further adjustments to the method may also be made to improve the correction, for example where there are multiple frames of image data, the statistics relating to blocks of the current frame of image data may be divided by the statistics relating to blocks of the previous frame of image data. In other embodiments, there may be an additional calibration stage where the minimum and maximum meshes are obtained, and which may be used to constrain any adjustments to the secondary meshes, thereby preventing errors being introduced due to large variations and other anomalous results.

FIG. 2 shows schematically a processor 200 according to examples. The processor 200 obtains image data 210 from a storage medium (not shown), the storage medium as described above may be storage of a device comprising the processor, may be obtained from an external source, such as a remote server, or from an external input device, such as an imaging apparatus or camera. The image data 210 may be stored within storage of the device, and the storage may be a random-access memory (RAM) such as DDR-SDRAM (double data rate synchronous dynamic random-access memory) or other volatile memory. In other examples, the storage may be or include a non-volatile memory such as Read Only Memory (ROM) or a solid-state drive (SSD) such as Flash memory. The storage in examples may include further storage devices, for example magnetic, optical or tape media, compact disc (CD), digital versatile disc (DVD) or other data storage media. The storage may be removable or non-removable from the device.

The image data 210 is received by an application module 220 of the processor 200 the application module applies a shading correction mesh 250 to the image data 210, the shading correction mesh 250 may be an initial shading correction mesh 250 based on an estimate of the adjustments to be applied to the image data 210. Alternatively, the shading correction mesh 250 may be an updated shading correction mesh 250u, generated by the processor 200, as will be described below. The shading correction mesh 250 may comprise a plurality of nodes and may be of any size. For example, if the image data is a 16-megapixel image, then the shading correction mesh 250 may be a 33 by 33 mesh of values, however it will be appreciated that other sized shading correction meshes 250 may be used, and the proportion of the size of the shading correction mesh 250 to the size of the image data 210 may also be different. In some examples, a portion of the image data 210 may have a shading correction mesh 250 applied to it, and further corrections may then be undertaken on that portion of the image data 210.

Once the shading correction mesh 250 has been applied to the image data 210 an analysis is undertaken by the analysis module 230. The analysis module divides the image data 210 into a number of blocks which are then grouped. The number of blocks need not be the same as the number of pixels, in fact, it is preferable, although not necessary, that the number of blocks is smaller than the number of pixels. For example, where the image data 210 is a 16-megapixel image, the number of blocks may form a grid 32 blocks by 32 blocks. Similarly, the number of blocks need not be the same as the number of values in the initial shading correction mesh 250.

Once the image data 210 has been separated into a plurality of blocks, a number of statistics may be determined for each of the blocks. The statistics may include determining a mean and/or variance for each of the channels of the image data for each block. For example, the statistics may include a mean of the red/green ratio over locations within a block, a mean of blue/green ratio over locations within the block, a variance of red/green ratio over locations within the block, and a variance of blue/green ratios over locations within the block. In some examples, the variance statistics calculated may be normalized by dividing them by the squared mean. The number of statistics calculated for each block is dependent on the number of channels associated with the image data. For example, where the image data 210 has three channels (e.g. a red, blue and green channel) there are two ratios used to generate the statistics, such as a red/green and blue/green ratio, where there are four channels, (e.g. a cyan, magenta, yellow, and black) three ratios may be used to generate the statistics. As such the number of ratios used to generate the statistics is determined based on the number of channels minus 1.

The statistics of each of the blocks of the image data 210 are then used to determine groups of the blocks. To determine which blocks could potentially be grouped, the variance values are compared. If the difference between the variance values of two blocks is below a predetermined threshold, then they are said to be hue flat. To determine whether these hue flat blocks should be grouped together a number of other characteristics may also be compared. For example, if two hue flat blocks are spatially close or adjacent, and/or have the same or substantially similar mean values then they may form part of the same grouping.

Once statistics for each of the blocks have been calculated they are passed to the generation unit 240, where statistics for groups of blocks may be determined. The generation unit may comprise a relationship determination unit for determining relationships between the groups, for example by calculating statistics for the groups of blocks are the same as those calculated for each of the individual blocks. Therefore, where the image data comprises three separate channels (such as a red, green and blue channel) the statistics may be a variance of the red/green ratio, a variance of the blue/green ratio, a mean of the red/green ratio and a mean of the blue/green ratio. It will be appreciated that other statistics on the groups of blocks, and/or the individual blocks of the image data 210 may be generated.

Once the statistics relating to the group of blocks have been generated, an error unit calculates a difference between each of the group statistics and the individual block statistics for the blocks making up the group. This produces a per-block error indicating how much each of the individual blocks differs from the overall group to which it belongs. In some examples, each of the errors may be smoothed by a smoothing unit using a small low-pass filter. Once the error has been calculated each block is then allocated the group of block's statistics. That is the block now has the statistics associated with the group and an error relating to that statistic and the original block value.

Once the errors and statistics have been calculated, they are used by an adjustment unit to generate an updated shading correction mesh 250u. The errors are then mapped to the initial, or where multiple rounds of correction have been undertaken, to the previous, shading correction mesh 250. However, the errors represent an error in a particular block, whereas the shading correction meshes 250 are represented as nodes.

As mentioned above, the shading correction mesh 250 and the block-wise representation need not be the same size. In such examples, the secondary mesh is representative of a node at each corner/vertex of a block. The values of each node of the secondary mesh may be calculated by the mean of the block-wise values of the blocks which have corners at that node. It will be appreciated that other methods for calculating the values of the nodes may be used. In such an example, most nodes of the secondary mesh are contributed to by 4 block values, nodes at the edge are contributed by 2 blocks each, and the four corner nodes are contributed by a single block, as will be described below with reference to FIG. 3B.

A secondary mesh may be produced for each of the statistical values calculated previously at item 140, for example where the image data comprises a red, green and blue channel, a secondary mesh may be generated for each of the red/green mean and the blue/green mean for example. Each node of the secondary mech may have an initial node value calculated by combining the mean values for each of the surrounding blocks, and each node may also have an associated error value calculated by combining the error values for each block, wherein the error values are associated with the differences between the block values and the group of blocks values as described above. An updated node value may then be determined based on the error and node value as described above in relation to item 150 of FIG. 1.

Once each of the nodes of the secondary mesh has been updated, the generation module 240 generates an updated shading correction mesh 250u for application to the image data 210. This may be achieved using a bilinear or bicubic interpolation between the nodes of the secondary correction mesh and the initial shading correction mesh 250, such that the values of the secondary correction mesh are mapped to the locations of the initial shading correction mesh 250.

The updated shading correction mesh 250u may then be provided back to the application module 210 for application to the image data 210. The application module may then determine whether further rounds of refinement are required and if so the updated shading correction mesh 250u and the image data 210 are passed back to the analysis module 230 so that a more accurate shading correction mesh may be generated. If it is determined that no further rounds of refinement are required, the processor 200 may output the processed data 210p.

FIG. 3A shows schematically a secondary mesh 300 for use in generating an updated shading correction mesh 250u to be applied to image data 200. As mentioned above, the secondary mesh 300 comprises nodes 310a, 310b, 310c, 310d, 340, 350 arranged at the corners/vertices of each of the block, such as block 320, of the image data 210. The number of blocks of the image data need not be the same as the number of data points in the image data 210, for example the number of blocks need not be the same as the resolution of the image. In fact, the number of blocks may be significantly smaller than the resolution of the image, for example, where the image is a 16-megapixel image, there may be 1024 blocks arranged in a 32 by 32 grid.

The statistics calculated for each of the blocks 320 may be used to determine the values of each of the nodes 310a, 310b, 310c, 310d, 340, 350 of the secondary mesh 300.

FIG. 3B shows schematically a portion 330 of the secondary mesh 300 of FIG. 3A, for use in generating an updated shading correction mesh 250u to be applied to image data 210. The portion 330 comprises nodes 310a, 310b, 310c, 310d which are calculated by determining the mean of the statistics of adjacent blocks A . . . J. For example, the value of the red/green or blue/green channel of node 310a is determined by taking the corresponding statistics (i.e. the mean of the red/green or blue/green channels) calculated for each of blocks A, B, D, and E and determining the mean of them. Similarly, the value of the red/green or blue/green channel of node 310d is calculated using the corresponding statistics of blocks E, F, H, and I. This is repeated for each of the internal nodes of the secondary mesh 300.

Returning the FIG. 3A, the value of the red/green or blue/green channel of node 340 which exists at the corner of the mesh 300, is based on the red/green or blue/green value of block A, and the value of the red/green or blue/green channel of node 350 may be based on a mean of corresponding statistics of the adjacent blocks, in this case blocks I and J.

Once the nodes of the secondary mesh have been calculated, they may be used to generate an updated shading correction mesh 250u, by using bilinear interpolation, bicubic interpolation, or any other suitable method, of mapping the secondary mesh nodes to the nodes of the shading correction mesh.

Figure 4:
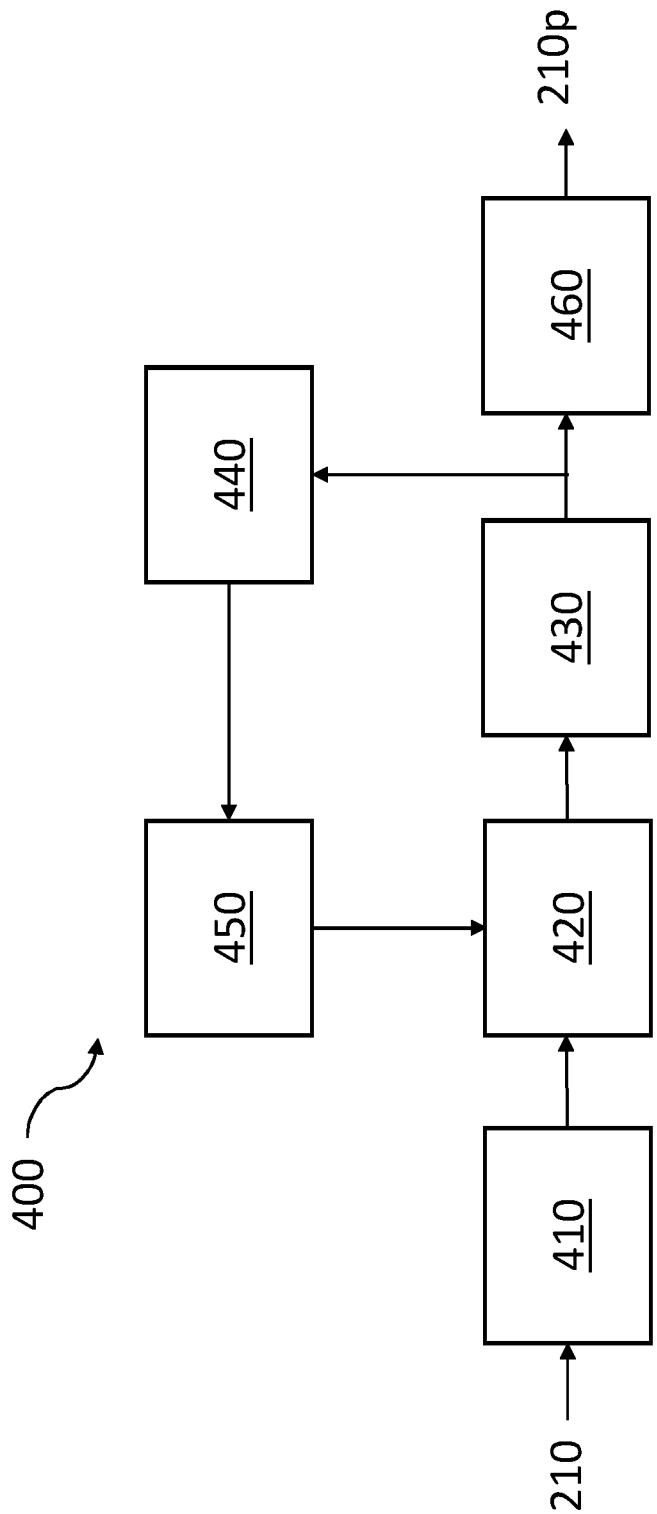
FIG. 4 shows schematically a process flow according to examples.

FIG. 4 shows schematically a process flow 400 according to examples. For example, the process flow may show the processing of image data 210 to produce processed image data 210 using an image signal processor. Image data 210 is received by the image signal processor and at item 410 a number of image processing algorithms may be applied to the image data, such as tone mapping, noise reduction, white balance correction and defect pixel correction, for example. Once the image data 210 has been processed an initial shading correction mesh may be applied at item 420, as described above the initial shading correction mesh may be based on an estimate of the adjustments to be applied to the image data 210. Once applied the process 400 may move to item 430 where further image processing algorithms may be applied to the image data having the initial shading correction mesh applied. If it is determined that no further corrections to the image data 210 are required the process may move to item 460 where yet further image processing algorithms may be applied to the image data 210, after which the processed image data 210p is output. If, however after item 430 it is determined that further shading corrections need to be applied to the image data 210, then the process progresses to item 440 where the means and variances associated with blocks of the image data 210, as described above in relation to FIGS. 1 and 2, are calculated. Once calculated the process moves to item 450 where an updated shading correction mesh is generated, based on the means and variances.

The updated shading correction mesh is then applied at item 420 and the process repeats until the desired level of shading correction is achieved. It will be appreciated that there may be any number of iterations of the process, and in each iteration, different image processing algorithms may be applied to the image data 210. In some iterations, there may be fewer algorithms applied, whereas in other iterations additional algorithms may be applied.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of calibrating image data, the method comprising the steps of:
   obtaining the image data;
   applying a shading correction mesh to the image data, wherein the shading correction mesh comprises a plurality of nodes, and is used to generate shading correction values for each pixel location in the image data;
   grouping blocks of the generated shading correction values into groups of blocks, each group of blocks comprising a plurality of blocks, and each block comprising a plurality of pixel locations;
   performing an analysis of each of the groups of blocks of generated shading correction values, wherein the analysis of each of the groups of block comprises determining at least a first comparison between a first channel of the image data and a second channel of the image data, and at least a second comparison between a third channel of the image data and the second channel of the image data; and
   generating an updated shading correction mesh based on the analysis of the groups of one or more blocks.

2. The method of claim 1, wherein the analysis indicates that the groups have substantially similar properties.

3. The method of claim 1, wherein at least the first comparison and the second comparison comprise at least one mean and at least one variance.

4. The method of claim 3, wherein the number of mean and the number of variance relationships corresponds to a number of channels of the image data minus one.

5. The method of claim 1, wherein an updated value for each pixel is generated based on at least one of the generated shading correction values, and the updated shading correction mesh.

6. The method of claim 1, wherein generating the updated shading correction mesh comprises grouping the blocks based on at least one of:
   determining which of the plurality of blocks have a hue variance below a predetermined threshold;
   determining a spatial relationship between each of the plurality of blocks; and
   determining whether the one or more relationships between the channels are substantially similar.

7. The method of claim 1, wherein generating the updated shading correction mesh comprises:
   computing at least one relationship for each of the groups;
   producing at least one corresponding target relationship for each of the groups;
   calculating an error for each group, by determining a difference between the at least one corresponding target relationship and the at least one relationship;
   smoothing the errors; and
   generating a secondary mesh by applying the errors, wherein the nodes of the secondary mesh are updated according to the errors of adjacent blocks.

8. The method of claim 7, wherein the step of generating the updated shading correction mesh comprises resampling the secondary mesh using a bilinear or bicubic interpolation.

9. The method of claim 1, wherein the shading correction mesh is a luminance shading correction mesh or a chroma shading correction mesh.

10. The method of claim 1, further comprising generating minimum and maximum shading correction meshes and limiting any adjustments so that the updated shading correction mesh lies between the minimum and maximum shading correction mesh.

11. A processor for calibrating image data comprising:
    an application module, for applying a shading correction mesh to the image data, wherein the shading correction mesh comprises a plurality of nodes, and is used to generate shading correction values for each pixel location in the image data;
    an analysis module, for performing an analysis of each of a plurality of blocks of the image data after application of the shading correction mesh, wherein the analysis of each of the groups of block comprises determining at least a first comparison between a first channel of the image data and a second channel of the image data, and at least a second comparison between a third channel of the image data and the second channel of the image data; and
    a generation module, for updating the shading correction mesh based on the analysis, wherein the updated shading correction mesh is based on groups of the one or more blocks of the image data.

12. The processor according to claim 11, wherein the generation module comprises a grouping unit for:
    determining which of the plurality of blocks have a hue variance below a predetermined threshold;
    determining a spatial relationship between each of the plurality of blocks; and
    determining whether the one or more relationships between the channels are substantially similar.

13. The processor according to claim 11, wherein the generation module comprises:
    a relationship determination unit for determining at least one relationship between the groups;
    a target generation unit for generating at least one corresponding target relationship for the groups;
    an error unit for determining an error between the at least one relationship and the corresponding target relationship;
    a smoothing unit for smoothing the error;
    a secondary mesh generation unit for generating a secondary mesh, wherein the nodes of the secondary mesh are updated according to the errors of the groups associated with adjacent blocks.

14. The method of claim 13, wherein the generation module updates the shading correction mesh by resampling the secondary mesh using a bilinear or bicubic interpolation.

15. The processor according to claim 11, wherein the processor is an image signal processor.

16. A non-transitory computer readable storage medium comprising a set of computer-readable instructions stored thereon which, when executed by at least one processor, cause the at least one processor to calibrate image data, the instructions comprising obtaining the image data;

applying a shading correction mesh to the image data, wherein the shading correction mesh comprises a plurality of nodes, and is used to generate shading correction values for each pixel location in the image data;

grouping blocks of the generated shading correction values into groups of blocks, each group of blocks comprising a plurality of blocks, and each block comprising a plurality of pixel locations;

performing an analysis of each for the groups of blocks of generated shading correction values wherein the analysis of each of the groups of block comprises determining at least a first comparison between a first channel of the image data and a second channel of the image data, and at least a second comparison between a third channel of the image data and the second channel of the image data; and generating an updated shading correction mesh based on the analysis of the groups of one or more blocks.

* * * * *